United States Patent [19]

Ochiai et al.

[11] Patent Number: 4,910,538

[45] Date of Patent: Mar. 20, 1990

[54] IMAGE FORMING APPARATUS INCLUDING A BELT-LIKE RECORDING MEDIUM HAVING AN EXPOSED CONDUCTIVE REGION

[75] Inventors: Toshihiko Ochiai, Tokyo; Yujiro Ando, Yokohama, both of Japan

[73] Assignee: Canon Kabushiki Kaisha, Tokyo, Japan

[21] Appl. No.: 388,980

[22] Filed: Aug. 3, 1989

[30] Foreign Application Priority Data

Aug. 23, 1988 [JP] Japan .............................. 63-207285

[51] Int. Cl.$^4$ .............................................. G01D 15/00

[52] U.S. Cl. ...................................... 346/162; 346/163

[58] Field of Search .......... 346/162, 163, 164, 76 PA, 346/76 R, 165, 150; 400/119, 120

[56] References Cited

U.S. PATENT DOCUMENTS

| | | | |
|---|---|---|---|
| 3,914,771 | 10/1975 | Lunde et al. | 346/150 |
| 4,264,913 | 4/1981 | Nakano et al. | 346/162 |
| 4,596,733 | 6/1986 | Cohen et al. | 346/162 |
| 4,766,447 | 8/1988 | Tsukada | 346/150 |

FOREIGN PATENT DOCUMENTS

| | | |
|---|---|---|
| 60-83078 | 5/1985 | Japan . |
| 61-80283 | 4/1986 | Japan . |
| 62-278585 | 12/1987 | Japan . |

*Primary Examiner*—Arthur G. Evans

*Attorney, Agent, or Firm*—Fitzpatrick, Cella, Harper & Scinto

[57] ABSTRACT

An image forming apparatus for forming an image by applying a toner on a recording medium by means of an electrostatic force has a belt-like recording medium comprising a laminated layer region. The laminated layer region includes (1) a conductive layer, (2) a surface insulating layer disposed on said conductive layer and having a conductive-layer region in which a portion of the conductive layer is exposed from the surface insulating layer, and (3) a protective layer comprising conductive particles dispersed in resin provided on a surface of the exposed conductive-layer region. Support structure is provided for stretching the belt-like recording medium. A driving source is also included for driving the belt-like recording medium. A conductive contact is provided for rubbing the exposed conductive-layer region, and a wiring member is provided for connecting the conductive contact to a biasing source.

15 Claims, 6 Drawing Sheets

IMAGE FORMING APPARATUS INCLUDING A BELT-LIKE RECORDING MEDIUM HAVING AN EXPOSED CONDUCTIVE REGION

BACKGROUND OF THE INVENTION

1. Field of the Invention

This invention is utilized for a printer, a display apparatus and the like, and relates to an image forming apparatus for forming a predetermined image by applying a voltage between a recording electrode and a recording medium and electrostatically applying a coloring material on the recording medium.

2. Description of the Prior Art

An example of such an image forming apparatus is disclosed in Japanese Patent Publication (Kokuku) No. 51-46707 (1976) (corresponding to U.S. Pat. No. 3,914,771). This apparatus carries a conductive magnetic toner 1, as a coloring material, on a nonmagnetic cylinder 3 by rotating a rotating magnet 2, and supplies the toner onto a recording electrode 4 made of a magnetic material, as shown in FIG. 7. A voltage corresponding to an image signal is then applied between a conductive layer 50*b* of a recording medium 50 (consisting of three layers comprising an insulating layer 50*a*, the conductive layer 50*b*, and a support layer (for example, a sheet of a mylar film) 50*c* in descending order from the surface) and the recording electrode 4. An image is formed by applying the toner 1 on the recording medium 50.

A display apparatus utilizing such an image forming apparatus is shown in FIGS. 8 and 9. That is, a predetermined image is formed on the recording medium 50 by adherence or nonadherence of the toner in accordance with the voltage applied by the recording electrode 4, and a recorded image observable by an eye E is formed on a display member at the right side in FIG. 8.

The belt-like recording medium 50 is formed by providing the conductive layer 50*b* and the insulating film 50*a* on the support layer 50*c* (consisting of a sheet, such as a mylar film or the like) in order to make the entire medium flexible. In order to reduce the cost of the recording medium 50 of the prior art, the conductive layer 50*b* is formed by depositing metal aluminum about 500 Å–1000 Å thick on a sheet 50*c* of mylar film in a vacuum. At one end portion of the belt-like recording medium, there is provided a region where the conductive layer 50*b* (made by vacuum deposition of metal aluminum) is exposed along the direction of rotation of the recording medium, and residual electric charges are removed by contacting a conductive brush 11 with the exposed conductive layer.

The above-described conventional apparatus, however, has the following disadvantages:

(1) A soft material made of carbon is used for the conductive brush 11 (FIG. 9) and contacts the exposed conductive layer of the recording medium. Although the material is soft, since the exposed conductive layer consists of a thin vacuum-deposited aluminum film (500–1000 Å) as described above, the portion consisting of vacuum-deposited aluminum peels off by abrasion and becomes nonconducting due to prolonged friction with the conductive brush. As a result, electric charges within the recording medium generated while recording remain for a long period. The conventional apparatus has therefore the disadvantage that a previously recorded image is displayed again due to the residual electric charges. The apparatus also has the disadvantage that the potential of the conductive layer consisting of vacuum-deposited aluminum changes due to incomplete removal of the electric charges causing the coloring material (the conductive magnetic toner) to adhere to blank portions other than recorded to produce a so-called fog.

(2) Contact resistance between the conductive brush 11 made of carbon and the exposed aluminum-deposited conductive layer of the recording medium becomes, in some cases, not less than 100 KΩ during operation, while it is not more than 1 KΩ in a standstill state. When the contact resistance thus increases, a previously recorded image can not be erased due to the residual electric charges as described above. The apparatus also has the disadvantage that the toner adheres to blank portions to produce fog and the like.

SUMMARY OF THE INVENTION

It is an object of the present invention to solve the problems of the prior art as described above.

It is another object of the present invention to provide an image forming apparatus which can efficiently remove residual electric charges and improve durability of an exposed region of a conductive layer.

These and other objects are accomplished, according to the present invention, by an image forming apparatus for forming an image by applying a toner on a recording medium by means of an electrostatic force, comprising a belt-like recording medium including a laminated-layer region having a conductive layer and a surface insulating layer. A conductive-layer region is formed in which a part of the conductive layer is exposed from the surface insulating layer along the direction of movement. The recording medium also includes a protective layer made by dispersing conductive particles in a resin and drying the resultant mixture is provided on the surface of the exposed layer. Support means are provided for stretching the recording medium, and a driving source is included for the recording medium. The apparatus also includes a conductive contact for rubbing the exposed region of the conductive layer, and a wiring member for connecting the contact to a biasing source.

DETAILED DESCRIPTION OF THE PREFERRED EMBODIMENTS

Figure 1:
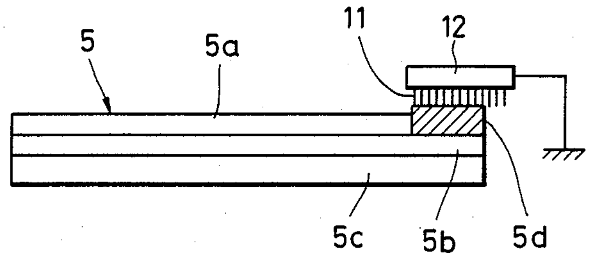
FIG. 1 is a cross-sectional view of a principal part of a first embodiment of the present invention.
Figure 2:
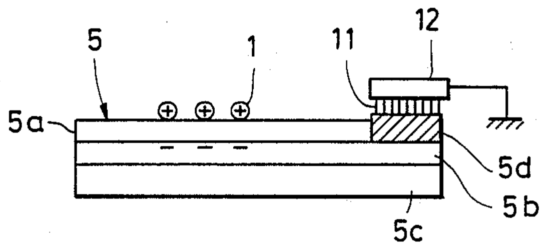
FIG. 2(*a*) and 2(*b*) are explanatory diagrams showing a state of removal of electric charges in the embodiment in FIG. 1.
Figure 2:
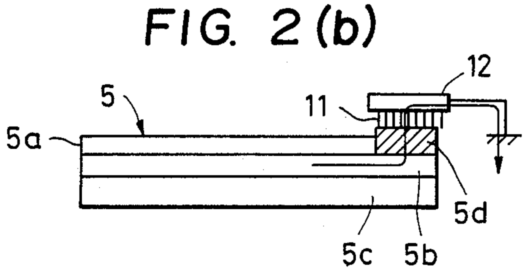
Figure 3:
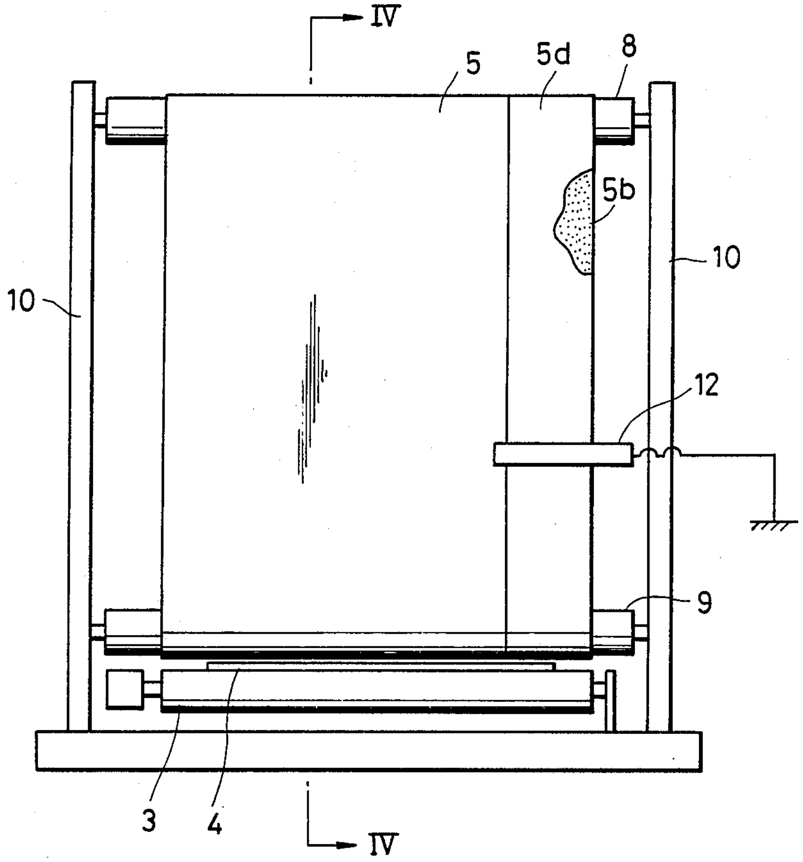
FIG. 3 is a front view showing an entire image forming apparatus using a recording medium in FIG. 1.
Figure 4:
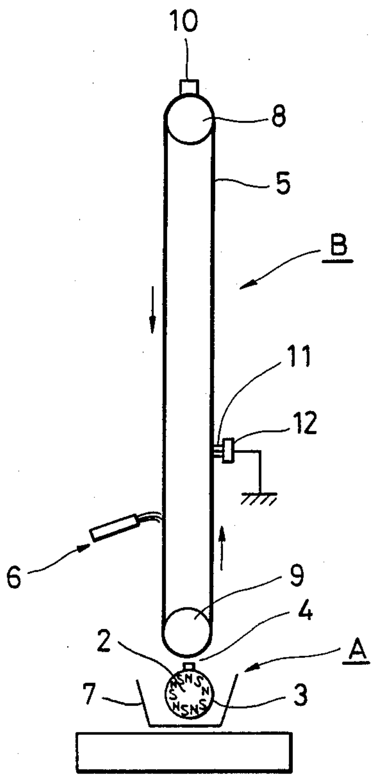
FIG. 4 is a cross-sectional view taken on line IV—IV in FIG. 3.

The present invention will be hereinafter explained according to the illustrated embodiments. FIGS. 1–3 show an image forming apparatus according to a first embodiment of the present invention. In FIGS. 1–3, an endless-belt-like recording medium 5 is rotatably wound between support members 8 and 9 disposed in parallel to each other at upper and lower ends of main-body frames 10. At a lower end portion of the recording medium 5, there is provided a recording unit A, and an image recorded at the recording unit A is visibly displayed on the display member B (FIG. 4). The image displayed on the recording medium 5 is removed by a cleaning member 6 at the backside of the display member B.

In the above-described recording unit A, a rotating magnet 2 is provided within a nonmagnetic cylinder 3 provided with a recording electrode disposed facing the recording medium 5, as in the conventional example. An image is formed by electrostatically applying a conductive toner 1 as a coloring material within a toner container 7 into the recording medium 5 in accordance with an image signal from a recording control unit (omitted in the figures).

A metal-aluminum layer *5b* is vacuum-deposited on a support layer *5c* of the recording medium 5, and one end portion thereof in the direction of the width of the recording medium is exposed. A paste-like carbon *5d*, which has been once dissolved in an organic solvent (thinner, toluene, ketones and the like), as a holding layer of the conductive layer is coated on the exposed portion of layer *5b* and dried. That is, the paste-like carbon is in a state in which a conductive carbon-black powder and a resin (selected from resins, such as polyethylene, polypropylene, phenol resins, acrylic resins, urethane and the like) are dissolved in a solvent (thinner, toluene, ketones and the like). The weight ratio of the carbon is about 2–15%.

On portions of the recording medium 5 other than the exposed region, there is provided an insulating layer *5a* as in the prior art.

Figure 9:
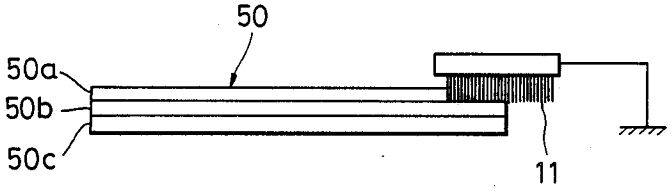
FIG. 9 is cross-sectional view of a principal part of the apparatus in FIG. 8.

A conductive brush 11 rubbing the carbon *5d* to remove residual electric charges is made or carbon, and is held by a support member 12 made of metal. When the conductive brush 11 directly contacts the deposited surface *5b* as shown in FIG. 9, contact resistance is not more than 1 KΩ in a standstill state, but a resistance value exceeding 100 KΩ is measured during operation. In the configuration according to the present embodiment (FIG. 1), however, the value of contact resistance between the coated carbon *5d* and the conductive brush 11 made of carbon is about 20–60 Ω both in a standstill state and during operation. Hence, it is possible to obtain a low and stable resistance value which is sufficient enough for removing extra electric charges and residual electric charges generated in the recording medium. The carbon paste can be easily coated on the surface of the aluminum-deposited conductive layer by diluting it in a solvent (thinner, toluene, ketones and the like) and using a brush or a roller. A conductive paint (in which a metal, such as copper, zinc, tin, silver or the like, other than carbon, is made into a paste), may also be used. In the present embodiment, a white-colored layer (0.5 μm–2 μm thick) consisting of titanium oxide or aluminum oxide is provided on a sheet of a myler film 100 μm thick as the support layer *5c* for the conductive layer. A carbon or metal paste-like paint is coated on the exposed region at the end portion and dried as described above.

Now, the effects of the present embodiment will be described.

As shown in FIG. 2, the conductive magnetic toner 1 (adhered to the recording medium 5 by the recording electrode) and the recording medium are attracted each other by an electrostatic force. That is, an attracting force is generated between the charged toner 1 and minus electric charges generated in the conductive layer *5b* within the recording medium. The recording medium 5 in which image formation has been finished is cleaned by the cleaning member 6 due to rotation. At this time, the toner 1 is forcibly dropped from the recording medium by the cleaning member. Subsequently, the minus electric charges left within the recording medium are also removed via the conductive brush 11. Accordingly, when the conductive brush 11 insufficiently contacts the conductive layer *5b* of the recording medium, the minus electric charges remains to provide a minus electric potential for the aluminum conductive layer, and unnecessary toner adheres to the recording medium.

As a result, as described in the problems of the prior art, a previously recorded image can not be erased, or so-called fog or the like appears. In the configuration of the present embodiment, since contact resistance between the above-described conductive brush and the exposed region of the recording medium is about 20–60 Ω, the residual electric charges can be smoothly removed.

(Other embodiments)

Figure 5:
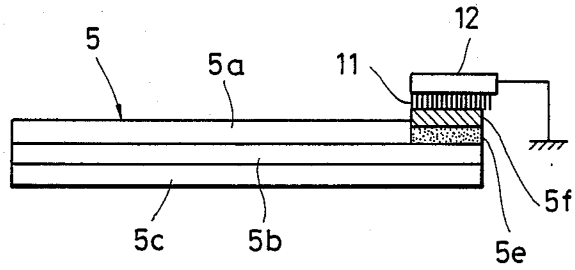
FIG. 5 is a cross-sectional view of a principal part of a second embodiment of the present invention.

As shown in FIG. 5, by attaching a thin metal tape (a copper tape in the present embodiment) *5f* using a conductive adhesive *5e* instead of the conductive paint in the first embodiment, it is possible to further prevent abrasion of the contact of the conductive member. In this case, in addition, the conductive brush 11 may be made of metal instead of carbon, and it is possible to provide an even lower contact resistance.

Figure 6:
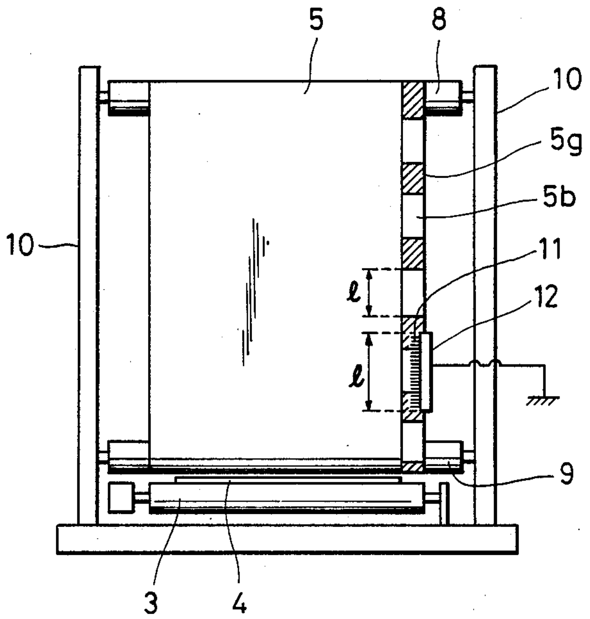
FIG. 6 is a front view showing an entire apparatus of a third embodiment of the present invention.
Figure 8:
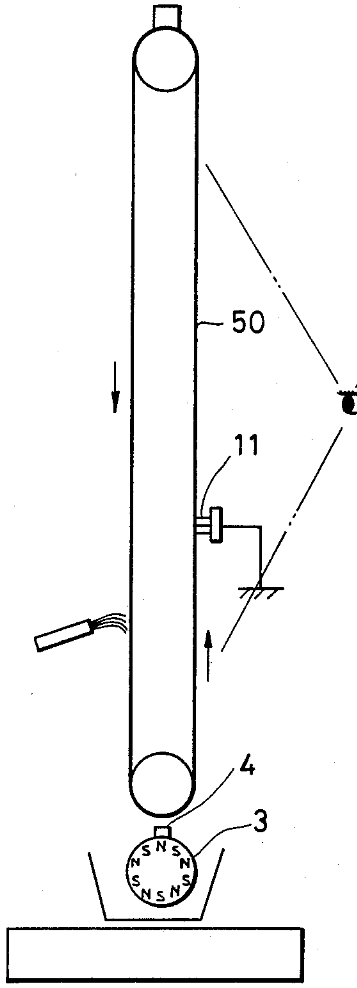
FIG. 8 is a vertical cross-sectional view of the conventional image forming apparatus.
Figure 7:
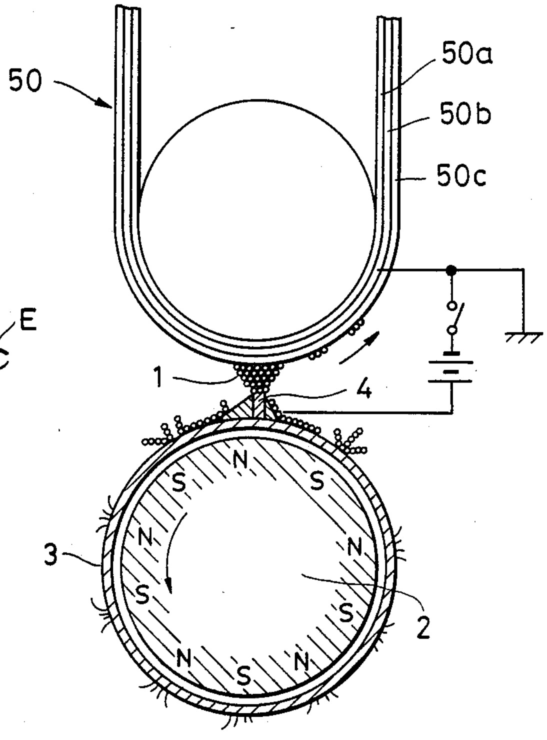
FIG. 7 is a principle configurational diagram of a conventional image forming apparatus.

In another embodiment, as shown in FIG. 6, an exposed region *5g* which contacts the conductive brush is not necessarily provided over the entire length of the recording medium along the direction of rotation, but may be intermittently provided along the direction of rotation. It is sufficient that the intermittently exposed region is provided at an interval 1' which is shorter than the length 1 of the brush (1>1').

As explained above, by providing a conductive protective layer for protecting a conductive layer on the surface of an exposed region of the conductive layer of a recording medium, it is possible to prevent peeling of the conductive layer due to rubbing with a conductive brush and the like, and it is possible to always maintain a low value of contact resistance even during operation. Hence, the present invention has the effect that a picture quality having an excellent contrast without fog can be obtained, and an image once recorded on a recording medium can be smoothly erased to improve picture quality.

Moreover, by using a protective layer of the present invention, the protective layer is not deteriorated over a long period of time even when the belt is bent at the support roller member, and the surface of the conductive layer is not oxidized due to the presence of the protective layer. Hence, it becomes possible to stably maintain an excellent picture quality.

What is claimed is:

1. An image forming apparatus for forming an image by applying a toner on a recording medium by means of an electrostatic force, comprising:

a belt-like recording medium comprising a laminated-layer region including (1) a conductive layer, (2) a surface insulating layer disposed on said conductive layer and having a conductive-layer region in which a part of the conductive layer is exposed from the surface insulating layer along a direction of movement of said belt-like recording medium, and (3) a protective layer comprising conductive particles dispersed in a resin provided on a surface of the exposed conductive-layer region;

support means for stretching said belt-like recording medium;

a driving source for driving said belt-like recording medium;

a conductive contact for rubbing said exposed conductive-layer region; and a wiring member adapted for connecting said conductive contact to a biasing source.

2. An image forming apparatus accoding to claim 1, further comprising a ground potential biasing source coupled to said wiring member.

3. An image forming apparatus according to claim 1, wherein said belt-like recording medium comprises a conductive layer made of aluminum disposed on a support made of a resin film, and an insulating layer comprising a resin layer formed on said conductive layer, and wherein said conductive contact comprises a brush-like electrode made of carbon fibers.

4. An image forming apparatus for forming an image to applying a toner on a recording medium by means of an electrostatic force, comprising:

a belt-like recording medium comprising a laminated-layer region including (1) a conductive layer, (2) a surface insulating layer disposed on said conductive layer and having a conductive region in which a part of the conductive layer is exposed from the surface insulating layer in a direction perpendicular to a direction of movement of said belt-like recording medium, and (3) a protective layer comprising conductive particles dispersed in a resin provided on a surface of the exposed layer conductive region;

support means for stretching said belt-like recording medium;

a driving source for driving said belt-like recording medium;

a recording electrode provided in the direction perpendicular to the direction of movement of said belt-like recording medium;

means for supplying a conductive toner between said recording electrode and said belt-like recording medium;

a conductive contact for rubbing said exposed conductive region; and a wiring member adapted for connecting the contact to a biasing source.

5. An image forming apparatus according to claim 4, further comprising a ground potential biasing source coupled to said wiring member.

6. An image forming apparatus according to claim 4, wherein said belt-like recording medium comprises a conductive layer made of aluminum disposed on a support made of resin film, and an insulating layer comprising a resin layer formed on said conducting layer, and wherein said conductive contact comprises a brush-like electrode made of carbon fibers.

7. An image forming apparatus for forming an image by applying a toner on a recording medium by means of an electrostatic force, comprising:

a belt-like recording medium comprising a laminated-layer region including (1) a conductive layer, (2) a surface insulating layer disposed on said conductive layer and having a conductive-layer region in which a part of the conductive layer is exposed from the surface insulating layer, and (3) a protective layer comprising conductive particles dispersed in a resin provided on a surface of the exposed conductive-layer region in a direction perpendicular to a direction of movement of said belt-like recording medium;

support means for stretching said belt-like recording medium;

a driving source for driving said belt-like recording medium;

a recording electrode provided in the direction perpendicular to the direction of movement of said belt-like recording medium;

mean for supplying a conductive toner between the recording electrode and said belt-like recording medium;

a conductive brush-like contact for rubbing said exposed conductive-layer region; and a wiring member adapted for connecting said brush-like contact to a biasing source.

8. An image forming apparatus accoding to claim 7, further comprising a ground potential biasing source coupled to said wiring member.

9. An image forming apparatus according to claim 7, wherein said belt-like recording medium comprises a conductive layer made of aluminum disposed on a support made of a resin film, and an insulating layer comprising a resin layer formed on said conductive layer, and wherein said conductive contact comprises a brush-like electrode made of carbon fibers.

10. An image display apparatus for displaying an image by applying a toner on a recording medium by means of an electrostatic force, comprising:

a belt-like recording medium comprising a laminated-layer region including (1) a conductive layer, (2) a surface insulating layer disposed on said conductive layer and having a conductive-layer region in which a part of the conductive layer is exposed from the surface insulating layer, and (3) a protective layer comprising conductive particles dispersed in a resin provided on the surface of the exposed layer in a direction perpendicular to a direction of movement of said belt-like recording medium;

support means for stretching said belt-like recording medium;

a driving source for driving said belt-like recording medium;

a recording electrode provided in the direction perpendicular to the direction of movement of said belt-like recording medium;

means for supplying a conductive toner between the recording electrode and said belt-like recording medium;

a conductive brush-like contact for rubbing said exposed conductive region; and a wiring member adapted for connecting said conductive contact to a biasing source.

11. An image display apparatus according to claim 10, further comprising a ground potential biasing source coupled to said wiring member.

12. An image display apparatus according to claim 10, wherein said belt-like recording medium comprises a conductive layer made of aluminum disposed on a support made of a resin film, and an insulating layer comprising a resin layer formed on said conductive layer, and wherein said conductive contact comprises a brush-like electrode made of carbon fibers.

13. An image display apparatus for displaying an image by applying a toner on a recording medium by means of an electrostatic force, comprising:

a belt-like recording medium comprising a laminated-layer region including (1) a conductive layer, (2) a surface insulating layer disposed on said conductive layer and having a conductive-layer region in which a part of the conductive layer is exposed from the surface insulating layer, and (3) a protective layer comprising conductive particles dispersed in a resin provided on the surface of the exposed layer in a direction perpendicular to a direction of movement of said belt-like recording medium;

support means for stretching said belt-like recording medium;

a driving source for driving said belt-like recording medium;

a recording electrode provided in the direction perpendicular to the direction of movement of said belt-like recording medium;

means for supplying a conductive toner between the recording electrode and said belt-like recording medium;

a conductive brush-like contact for rubbing said exposed conductive-layer region; and a wiring member adapted for connecting said conductive contact to a biasing source.

14. An image display apparatus according to claim 13, further comprising a ground potential biasing source coupled to said conductive contact.

15. An image display apparatus according to claim 13, wherein said belt-like recording medium comprises a conductive layer made of aluminum disposed on a support made of a resin film, and an insulating layer comprising a resin layer formed on said conductive layer, and wherein said conductive contact comprises a brush-like electrode made of carbon fibers.

* * * * *